(12) United States Patent
Wieland et al.

(10) Patent No.: US 12,384,441 B2
(45) Date of Patent: Aug. 12, 2025

(54) ELECTRIC CIRCUIT STRUCTURE FOR AN ALTERNATING HEATING AND CAPACITIVE MEASURING MODE WITH FUNCTION TEST, AND ASSOCIATED METHOD

(71) Applicant: Preh GmbH, Bad Neustadt a.d. Saale (DE)

(72) Inventors: Friedrich Wieland, Bad Neustadt a.d. Saale (DE); Georg Daniel, Bad Neustadt a.d. Saale (DE)

(73) Assignee: Preh GmbH, Bad Neustadt a.d. Saale (DE)

( * ) Notice: Subject to any disclaimer, the term of this patent is extended or adjusted under 35 U.S.C. 154(b) by 211 days.

(21) Appl. No.: 18/159,888

(22) Filed: Jan. 26, 2023

(65) Prior Publication Data

US 2023/0257015 A1     Aug. 17, 2023

(30) Foreign Application Priority Data

Jan. 27, 2022   (DE) .......................... 102022101912.8

(51) Int. Cl.
| | | |
|---|---|---|
| *B62D 1/06* | (2006.01) | |
| *B60R 16/027* | (2006.01) | |
| *G01V 3/08* | (2006.01) | |

(52) U.S. Cl.
CPC .............. *B62D 1/06* (2013.01); *B60R 16/027* (2013.01); *G01V 3/088* (2013.01)

(58) Field of Classification Search
CPC .......... B62D 1/06; B62D 1/046; B62D 1/065; B60R 16/027; G01V 3/088; H05B 2203/035; H05B 1/0236; H05B 1/0238; H05B 1/02; H05B 3/12; H05B 3/34;
(Continued)

(56) References Cited

U.S. PATENT DOCUMENTS

| | | | |
|---|---|---|---|
| 6,445,294 B1 * | 9/2002 | McDonnell ............ | G01B 7/023 340/561 |
| 9,726,775 B2 * | 8/2017 | Lamesch .................. | G01V 3/08 |

(Continued)

FOREIGN PATENT DOCUMENTS

DE     112012000923     11/2013

OTHER PUBLICATIONS

First German Office Action, DE102022101912.8, Nov. 28, 2022.

*Primary Examiner* — Feba Pothen
(74) *Attorney, Agent, or Firm* — M&B IP Analysts, LLC

(57) ABSTRACT

The present disclosure relates to a circuit and a method for carrying out an alternating heating and capacitive measuring mode by a common heating wire, including carrying out a heating mode, wherein, due to a switching by a control circuit, first switching elements and second switching elements are connected in series to the heating wire, and the heating wire is connected, to one of two heating potentials; triggering a switchover from the heating mode into a measuring mode by the control circuit; carrying out the measuring mode, in which the measuring capacitance of the heating wire relative to a reference potential is determined by a detecting circuit by applying to the heating wire an alternating voltage; carrying out a testing phase by a test circuit that is switched by the control circuit that a test impedance is connected to the measuring capacitance.

17 Claims, 2 Drawing Sheets

(58) Field of Classification Search
CPC .. H05B 3/78; H05B 2214/00; G01R 27/2605; B60N 2/002; B60N 2/5678; B60N 2/5685
See application file for complete search history.

(56) References Cited

U.S. PATENT DOCUMENTS

| | | | | |
|---|---|---|---|---|
| 2010/0038351 | A1* | 2/2010 | Tabaczynski | B60L 1/08 |
| | | | | 219/217 |
| 2013/0334196 | A1* | 12/2013 | Lamesch | B60N 2/0035 |
| | | | | 219/217 |
| 2016/0096543 | A1* | 4/2016 | Naitou | H05B 3/34 |
| | | | | 219/204 |

* cited by examiner

ELECTRIC CIRCUIT STRUCTURE FOR AN ALTERNATING HEATING AND CAPACITIVE MEASURING MODE WITH FUNCTION TEST, AND ASSOCIATED METHOD

In vehicles, the steering wheel and driver's seat of a motor vehicle are generally equipped with an electric heating system as a comfort function; for this purpose, a heating wire is routed through the grip portion, particularly the steering wheel rim of the steering wheel, or the seat cushion and the backrest cushion of the seat. Because of safety considerations, but also in order to realize additional comfort functions, there is a demand for a capability of also carrying out a detection of a touch or at least an approach, such as the so-called hands-on detection, the purpose of which is to monitor the gripping of the steering wheel rim, or the driver/passenger recognition, the purpose of which is, for example, the seating position-specific activation or deactivation of particular comfort functions. It therefore makes sense to use the heating wire, during a non-heating phase, as an electrode for a capacitive approach detection in the so-called measuring mode. Since the heating mode is usually carried out with a pulse-width modulated heating current, there are phases in which no heating current is applied and which are used for the measuring mode. In order to avoid, during the measuring mode, interferences from "all sides", i.e. from all poles of the heating voltage providing the heating current, into the heating wire as a capacitive electrode and a reference electrode or the mass potential, it is known from DE 11 2014 002 044 T5, for example, to separate in the measuring mode the heating wire on all poles from the poles providing the different heating potentials, using field effect transistors. Switching means, particularly field effect transistors, have parasitic capacitances that may cause disturbances when determining the actual measuring capacitance. US 2010/0038351 A1 proposes that the insulating effect of the blocking switching means be supported in the measuring mode by additional impedances, in particular diodes, wherein a shielding signal may additionally be applied to the connecting line between the diodes and the switching means. Such a solution is disadvantageous in that the additional impedances, particularly the diodes, affect the heating current, in particular have ohmic losses, and thus, the electrical heating voltage cannot be optimally converted into thermal heating power (Joule heat) released by the heating wire. Another problem of using the heating wire as an electrode for capacitive approach detection is that the electrode, due to alternating between the heating mode and the measuring mode as a non-heating mode, is subject to a high thermal stress and heat-related fluctuations in expansion, which ultimately also result in a failure of the heating wire but also in fluctuations in the sensitivity of the detecting circuit connected to the heating wire.

Against this background, it is the object of the present disclosure to provide a circuit structure for an alternating heating and capacitive measuring mode, in which, in addition to the efficient use of the heating current in the heating mode, the reliability of the capacitive approach measurement in the measuring mode can at least be ensured or even improved.

This object is achieved by a circuit structure of claim 1. Other features, embodiments, properties and advantages are apparent from the dependent claims, the description and the Figures. A method for carrying out an alternating heating and capacitive measuring mode by means of a common heating wire according to the present disclosure, as well as the use of the circuit assembly according to the present disclosure, are each the subject matter of the co-ordinated independent claims.

The present disclosure relates to an electric circuit structure for an alternating heating and capacitive measuring mode using a common heating wire, wherein in the heating mode, the heating wire, which is a resistance wire, for example, such as a nickel-chrome wire, is flooded with an electric heating current supplied by two poles at two different heating potentials, wherein a heating voltage drops on the heating wire. The circuit assembly has a pair of first switching elements and a pair of second switching elements. Preferably, the first switching elements are formed by a transistor, more preferably in each case a field effect transistor, most preferably a metal-oxide-semiconductor field-effect transistor (MOS-FET). More preferably, the first and second switching elements are realized by a transistor, more preferably in each case a field effect transistor, most preferably a metal-oxide-semiconductor field-effect transistor (MOS-FET). The heating wire is in this case connected to the first and second switching elements in such a way that in the heating mode, during which the first and second switching elements, and thus simultaneously, are in a conducting state, the first and second switching elements and the heating wire are connected in series. In this case, the heating wire is conductively connected, in each case via a first switching element and a second switching element connected via a conductor portion to the first switching element, to one of two different heating potentials, e.g. vehicle ground on the one hand and the positive battery potential on the other. Because the first and second switching elements are connected through in the heating mode, the heating wire is flooded with the heating current. If at least one switching element of the first and second switching elements is in the non-conducting or blocking state, no heating current is present. By periodically switching and changing the duration of the respective heating mode, e.g. by controlling at least one or all switching elements by means of a pulse-width modulated signal, the heating power of the heating wire can thus be adjusted.

According to the present disclosure, there is also provided a detecting circuit, in order to determine, in a measuring mode taking place outside of the time frame of the heating mode, the measuring capacitance of the heating wire relative to a reference potential, e.g. that of the reference electrode or the vehicle ground, by applying to the heating wire an alternating voltage from an AC voltage source. Based on a change in this measuring capacitance, the approach of a vehicle occupant, or at least the approach of a hand of the vehicle occupant, can be detected, for example. Various methods for determining the measuring capacitance of this kind are known. According to the present disclosure, such methods are used herein in which the measuring capacitance can be reliably detected by applying an alternating voltage to the heating wire as a transmitting electrode. Amplitude-modulated detecting circuits supply the capacitor, which is formed by the heating wire and which is to be subjected to measuring, with a high-frequency alternating current (e.g. 20 kHz) and detect the resulting reactive current.

In frequency-modulated detecting circuits, the measuring capacitance to be subjected to measuring is connected to an inductance to form a resonant circuit as a component of an LC oscillator, whose frequency is measured by being compared with a reference. In another variant of the frequency-modulated detecting circuit, the measuring capacitance is a component of an astable multivibrator. Preferably, the detecting circuit is designed for measuring in the measuring mode a current curve between the heating conductor and the AC voltage source resulting from the application of the alternating voltage, in order to determine therefrom the respective measuring capacitance, based on a phase shift between the alternating voltage and the current curve. For example, the current curve is measured based on a voltage drop on a shunt resistor (shunt) while amplifying the signal by means of a measuring amplifier.

According to the present disclosure, there is also provided a control circuit for switching the first switching elements and second switching elements from the heating mode into the measuring mode, during which the first switching elements and the second switching elements are in a blocking state, so that the two connections of the heating wire with the two different heating potentials, which are electrically conducting in the heating mode, are each interrupted several times in the measuring mode. The multiple interruptions with regard to the two heating potentials is advantageous in that, in addition to the particularly effective capacitive decoupling of the heating wire with respect to the heating potentials and the reduction of the parasitic capacitances on the connection with the heating potentials, which is interrupted several times and in which now the switching elements are to be considered as series-connected capacitive impedances, a detecting circuit using an alternating voltage can also be used in an improved manner, because the first switching elements, as opposed to the non-symmetrically connected diodes of the prior art, for example, separate symmetrically, and this separation has an effect on both current directions of the alternating current generated in the measuring mode, which facilitates and improves the determination of the measuring capacitance by means of alternating voltage, but particularly the preferred path via the detection of the phase shift.

According to the present disclosure, the control circuit is further configured for switching in a testing phase, which takes place within the time frame of the measuring mode, a test circuit containing at least one third switching element and one test impedance such that the test impedance is connected to the measuring capacitance, and an associated change in measuring capacitance and/or a total impedance including the measuring capacitance and the test impedance is at least detected by the detecting circuit. For example, a change in the measuring capacitance caused by connecting the test impedance is detected merely qualitatively. Another embodiment provides a quantitative measurement of the resulting total impedance including the measuring capacitance and the test impedance in order to permit a calibration of the detecting circuit by means of the predetermined test impedance. In a simple embodiment, an examination is made only with regard to a coincidence in time of the change in measuring capacitance and the change in the switching state. By providing the testing phase and the associated design features, it is possible by a comparatively simple technical expansion of the design of a heating and measuring circuit to test the integrity of the heating wire on the one hand, but on the other hand also the function of the detecting circuit, and in the case of a quantitative test, e.g. by determining the change in measuring capacitance or the total impedance resulting in the testing phase, to carry out a calibration of the detecting circuit or downstream evaluation devices. Preferably, the duration of the testing phase is shorter than the duration of a measuring mode carried out between two successive heating modes. At least one third switching element is in a blocking state in the period outside of the testing phase. For example, the time ratio of the duration of the testing phase to the total duration of the measuring mode containing the testing phase is less than 1/10.

In one embodiment, the testing phase takes place exclusively over a period within which an approach of the hands to the steering wheel is excluded, e.g. in the locked, unoccupied state of the vehicle cabin. In another embodiment, the testing phase is carried out exclusively when no approach was detected in a preceding measuring mode taking place outside the testing phase. In one embodiment, the testing phase is carried out at the start of a measuring mode. In the alternating sequence of the heating mode and the measuring mode, it may be provided that among several measuring modes, at least one, preferably the majority of measuring modes, is carried out without a testing phase.

The connection entails, for example, that a test impedance is connected to the measuring capacitance in series. Preferably, however, it is provided that the test impedance associated with the test circuit is connected to the measuring capacitance in parallel in the testing phase.

Preferably, the third switching element connects the heating wire to the reference potential via the test impedance in an electrically conducting manner in the testing phase. Preferably, the test impedance is a capacitor with a predetermined test capacitance. In order to avoid parasitic capacitances, the third switching element is preferably a bipolar transistor.

Preferably, the circuit structure is designed such that the heating mode and the measuring mode are operated in an alternating manner. For example, the control circuit is configured for generating a pulse-width modulated control signal for the first and/or second switching elements. Moreover, a microcontroller, for example, is provided in order to vary the duty cycle of the pulse-width modulated control signal in accordance with a desired and/or predetermined heating power.

According to a preferred embodiment of the circuit structure according to the present disclosure, there is also provided a shielding circuit, which is configured to apply to at least the conductor portions between, in each case, the first and the second switching element the alternating voltage from the AC voltage source during the measuring mode. In this case, the repeated usage of the term alternating voltage is supposed to refer to the fact that the alternating voltage present on the heating wire in the measuring mode and the alternating voltage present on the conductor portions substantially match each other with respect to amplitude, frequency and phase in order to obtain an optimum shielding effect.

According to a preferred embodiment, at least the first switching elements are transistors, in particular field effect transistors, and the shielding circuit is designed such that in the measuring mode, the alternating voltage is applied in each case to a control terminal of the associated transistor, such as base or gate, in order to obtain a particularly effective shielding effect. In this case, the alternating voltage and/or the first switching elements are designed such that a switching process of the first switching elements in the measuring mode is excluded.

According to a preferred embodiment, the detecting circuit is supplemented with a compensating circuit for compensating a temperature-dependent blocking behavior of the first switching elements, particularly if they are configured as field effect transistors and a temperature-dependent reactive current cannot be suppressed completely. In order to compensate this, the compensating circuit is configured, for example, to change the operating point of the measuring amplifier measuring the curve of the alternating current in a temperature-dependent manner and so as to counteract the change of the blocking behavior. For this purpose, the compensating circuit has, for example, a microcontroller-controlled reference circuit forming an R-2R network.

Furthermore, the present disclosure relates to a use of the circuit structure of one of the above-described embodiments in a motor vehicle, wherein the heating wire is integrated into a steering wheel of the motor vehicle, e.g. into a steering wheel rim of the steering wheel.

The present disclosure further relates to a method for carrying out an alternating heating and capacitive measuring mode by means of a common heating wire, comprising the following steps.

In a heating mode, a pair of first switching elements and a pair of second switching element are switched to a conducting state by a control circuit. During this heating mode, the first switching elements and the second switching elements and the heating wire are connected in series. Further, in the heating mode, the heating wire is conductively connected, in each case via a first switching element and a second switching element connected via a conductor portion to the first switching element, to one of two different heating potentials, so that the heating wire is supplied with a heating current due to the different heating potentials.

In a subsequent step, a switchover of the first switching elements and the second switching elements from the heating mode into a measuring mode is triggered by the control circuit, wherein the first switching elements and the second switching elements are in a blocking state during the measuring mode. Thus, the two connections of the heating wire with the two different heating potentials, which are electrically conducting in the heating mode, are each interrupted several times in the measuring mode. During the measuring mode, the measuring capacitance of the heating wire relative to a reference potential is determined by a detecting circuit by applying to the heating wire an alternating voltage from an AC voltage source. Then, a switchover from the measuring mode into the heating mode preferably takes place; more preferably, the heating mode and the measuring mode are operated in an alternating manner.

According to the disclosed embodiments, a testing phase is carried out, which takes place within the time frame of the measuring mode, and during which, by means of a test circuit containing at least one third switching element and one test impedance, the test circuit is switched such by the control circuit that a test impedance is connected to the measuring capacitance, and an associated change in measuring capacitance and/or a total impedance including the measuring capacitance and the test impedance is at least detected by the detecting circuit.

For example, a change in the measuring capacitance caused by connecting the test impedance is detected merely qualitatively. Another embodiment provides a quantitative measurement of the resulting total impedance including the measuring capacitance and the test impedance in order to permit a calibration of the detecting circuit by means of the predetermined test impedance. In a simple embodiment, an examination is made only with regard to a coincidence in time of the change in measuring capacitance and the change in the switching state.

By providing the testing phase and the associated design features, it is possible by a comparatively simple technical expansion of the design of a heating and measuring circuit to test the integrity of the heating wire on the one hand, but on the other hand also the function of the detecting circuit, and in the case of a quantitative test, e.g. by determining the change in measuring capacitance or the total impedance resulting in the testing phase, to carry out a calibration of the detecting circuit or downstream evaluation devices. Preferably, the duration of the testing phase is shorter than the duration of a measuring mode carried out between two successive heating modes. At least one third switching element is in a blocking state in the period outside of the testing phase. For example, the time ratio of the duration of the testing phase to the total duration of the measuring mode containing the testing phase is less than $1/10$.

In one embodiment, the testing phase takes place exclusively over a period within which an approach of the hands to the steering wheel is excluded, e.g. in the locked, unoccupied state of the vehicle cabin. In another embodiment, the testing phase is carried out exclusively when no approach was detected in a preceding measuring mode taking place outside the testing phase. In one embodiment, the testing phase is carried out at the start of a measuring mode. In the alternating sequence of the heating mode and the measuring mode, it may be provided that among several measuring modes, at least one, preferably the majority of measuring modes, is carried out without a testing phase.

The connection entails, for example, that a test impedance is connected to the measuring capacitance in series. Preferably, however, it is provided that the test impedance associated with the test circuit is connected to the measuring capacitance in parallel during the testing phase.

Preferably, the third switching element connects the heating wire to the reference potential via the test impedance in an electrically conducting manner in the testing phase. Preferably, the test impedance is a capacitor with a predetermined test capacitance. In order to avoid parasitic capacitances, the third switching element is preferably a bipolar transistor.

According to a preferred embodiment of the method according to the disclosed embodiments, the alternating voltage from the AC voltage source is applied by a shielding circuit to the conductor portions during the measuring mode. In this case, the usage of the term alternating voltage is supposed to refer to the fact that the alternating voltage present on the heating wire in the measuring mode and the alternating voltage present on the conductor portions substantially match each other with respect to amplitude, frequency and phase in order to obtain an optimum shielding effect.

According to a preferred embodiment, at least the first switching elements are realized by transistors, in particular field effect transistors, wherein, because of the design of the shielding circuit, in the measuring mode, the alternating voltage is applied in each case to a control terminal of the associated transistor, such as base or gate, in order to obtain a particularly effective shielding effect. In this case, the alternating voltage and/or the first switching elements are designed such that a switching process of the first switching elements in the measuring mode is excluded.

According to a preferred embodiment of the method, a current curve between the heating conductor and the AC voltage source resulting from the application of the alternating voltage is measured in the measuring mode by the detecting circuit, in order to determine therefrom the capacitance based on a phase shift between the alternating voltage and the current curve.

According to a preferred embodiment of the method, a temperature-dependent blocking behavior of the first switching elements is compensated during the detection process, particularly if they are configured as field effect transistors and a temperature-dependent reactive current cannot be suppressed completely. In order to compensate this, the detecting circuit is supplemented with a compensating circuit, which changes the operating point of the measuring amplifier measuring the curve of the alternating current in a temperature-dependent manner and so as to counteract the change of the blocking behavior. For this purpose, the compensating circuit has, for example, a microcontroller-controlled reference circuit forming an R-2R network.

The various embodiments are explained further with reference to the following Figures. The Figures are to be understood only as examples and merely represent a preferred embodiment. In the Figures.

Figure 1:
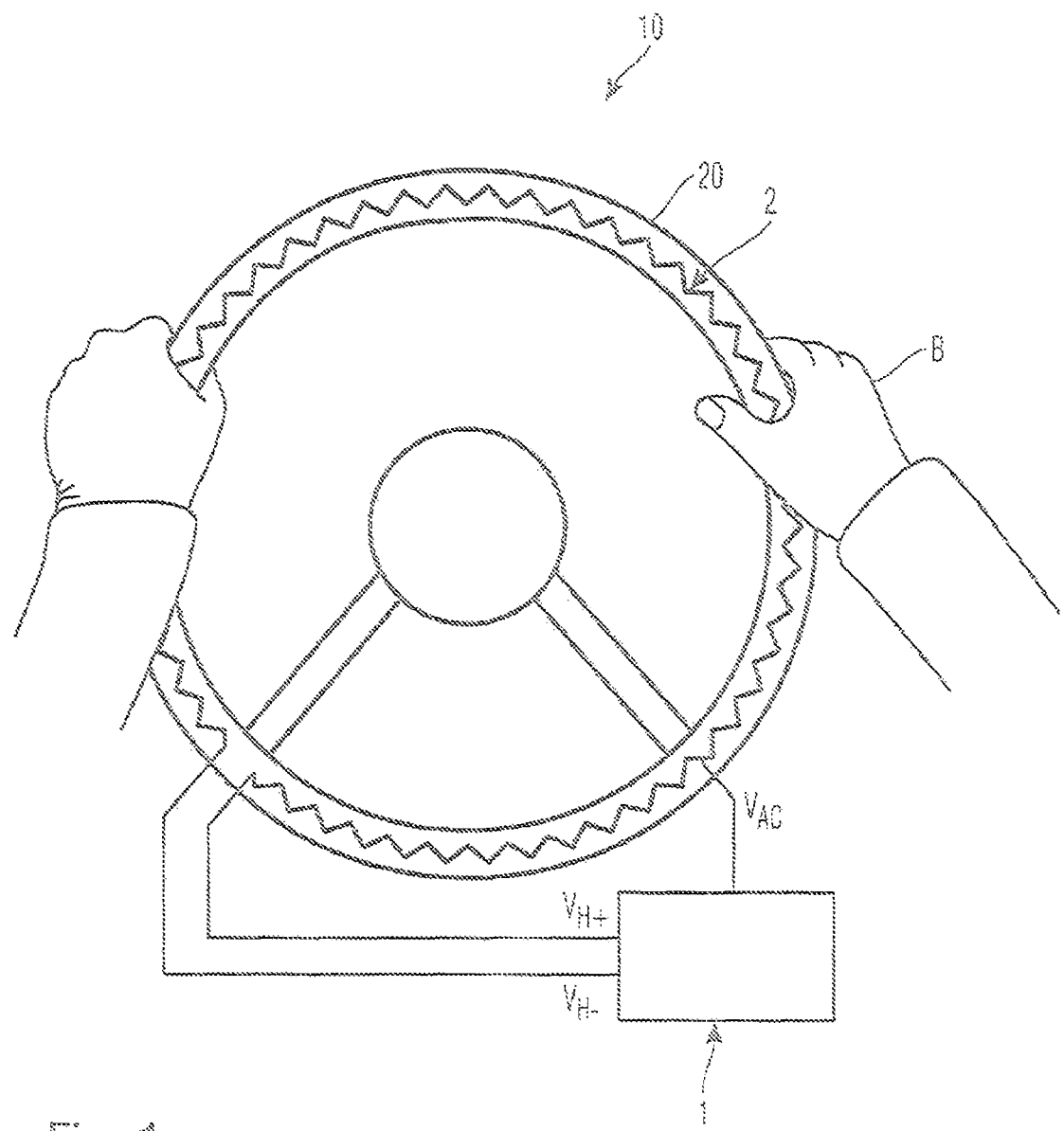
FIG. 1 shows a schematic top view of a steering wheel with a heating wire, which is integrated therein and belongs to the circuit structure according to an embodiment.

FIG. 1 shows the use of the circuit structure 1 according to the embodiment in a steering wheel 10 of a motor vehicle that is not depicted. A heating wire 2, which is a resistance wire, for example, such as a nickel-chrome wire, is integrated into the grip portion 20, in this case the steering wheel rim, of the steering wheel in order to, on the one hand, heat in a heating mode of the circuit structure 1 the grip portion 20 for a vehicle occupant B gripping the steering wheel 10, and, on the other hand, carry out a capacitive detection of a touch or approach with regard to the hand of the vehicle occupant B touching the grip portion 20 or approaching the grip portion 20. Because of safety considerations, but also in order to realize additional comfort functions, this capacitive detection of a touch or at least an approach is provided for performing the so-called hands-on detection, for example, the purpose of which is to monitor the gripping of the steering wheel rim, or performing the driver/passenger recognition, the purpose of which is, for example, the seating position-specific activation or deactivation of particular comfort functions. As indicated in FIG. 1, the heating wire 2 is supplied in the heating mode with a heating current from the different heating potentials $V_{H+}$, $V_{H-}$. For example, $V_{H-}$ is at vehicle ground potential. In the measuring mode, an alternating voltage $V_{AC}$ is applied by the circuit structure 1 according to the embodiment to the heating wire 2.

Figure 2:
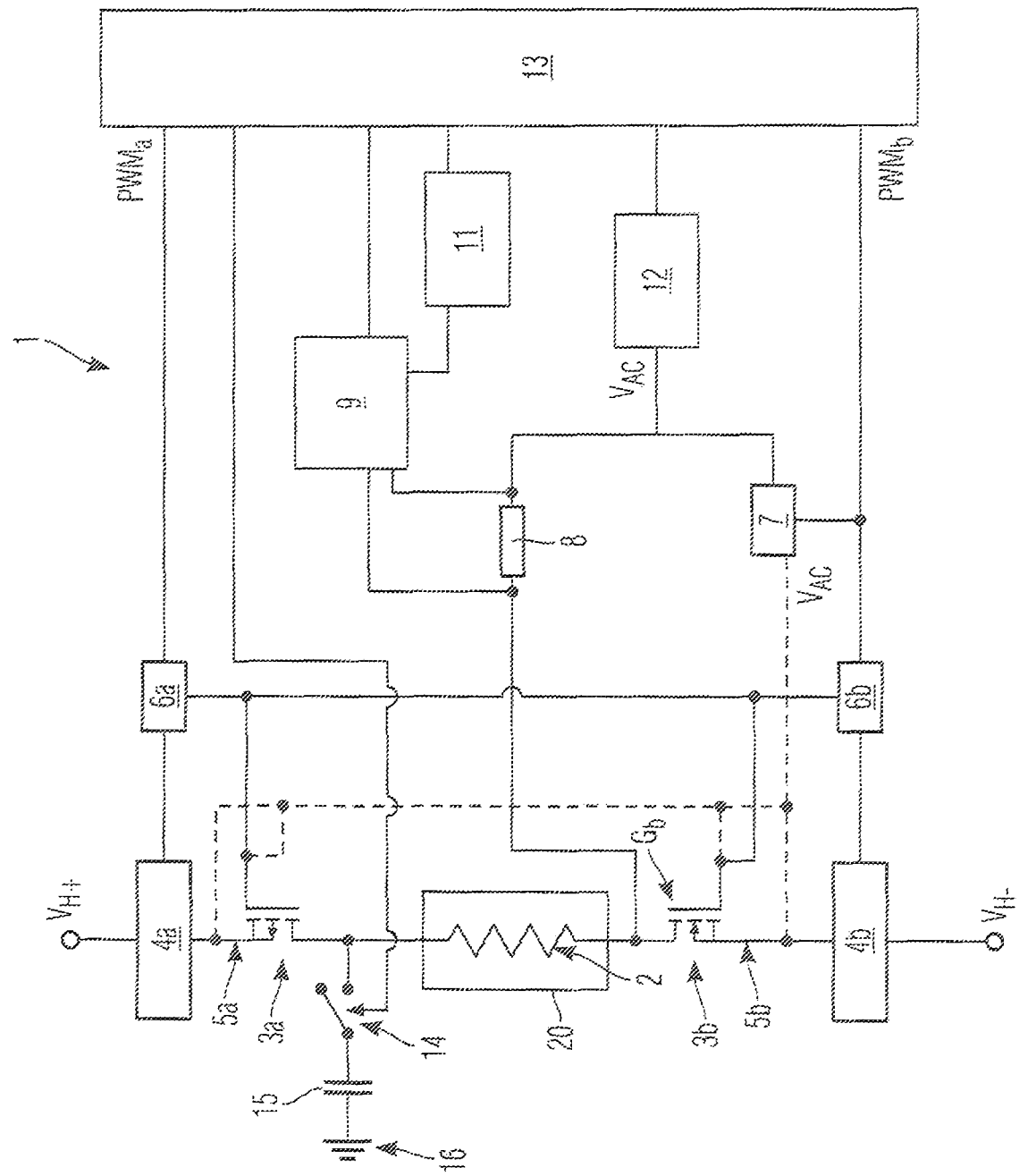
FIG. 2 shows a schematic view of the circuit structure according to the embodiment.

FIG. 2 schematically shows the electric circuit structure 1 for the alternating heating and capacitive measuring mode using a common heating wire 2. In this case, the heating wire 2 is flooded in the heating mode with an electric heating current supplied by two poles at the two different heating potentials $V_{H+}$, $V_{H-}$, wherein a heating voltage drops on the heating wire 2. For this purpose, the circuit assembly 1 has a pair of first switching elements 3a, 3b and a pair of second switching elements 4a, 4b. Here, the first switching elements 3a, 3b are formed in each case by a field effect transistor, in particular a self-blocking field effect transistor, preferably a metal-oxide-semiconductor field-effect transistor (MOS-FET). The second switching elements 4a, 4b are also realized in each case by a transistor, more preferably in each case a field effect transistor, most preferably a metal-oxide-semiconductor field-effect transistor (MOS-FET). The heating wire 2 is in this case connected to the first switching elements 3a, 3b and the second switching elements 4a, 4b in such a way that in the heating mode, during which the first switching elements 3a, 3b and the second switching elements 4a, 4b, and thus simultaneously, are in a conducting state, the first switching elements 3a, 3b and the second switching elements 4a, 4b and the heating wire 2 are connected in series. In this case, the heating wire 2 is conductively connected, in each case via a first switching element 3a, 3b and a second switching element 4a, 4b connected via a conductor portion 5a, 5b to the first switching element 3a, 3b, to one of the two different heating potentials $V_{H+}$, $V_{H-}$. Because the first switching elements 3a, 3b and the second switching elements 4a, 4b are connected through (are conducting) in the heating mode, the heating wire 2 is flooded with the heating current. If at least one switching element of the first switching elements 3a, 3b and second switching elements 4a, 4b is in the non-conducting or blocking state, no heating current is present. By periodically switching and changing the duration of the respective heating mode, e.g. by controlling at least one or all switching elements 3a, 3b; 4a, 4b by means of a pulse-width modulated control signal $PWM_a$ or $PWM_b$ of a microcontroller 13, which is associated with the control circuit 6a, 6b, 13 and which controls the control circuit parts 6a, 6b of the control circuit 6a, 6b, 13 assigned to the switching elements 3a, 3b; 4a, 4b, the heating power of the heating wire 2 can thus be adjusted. During the heating mode, the switching element 14 associated with the test circuit 14, 15 explained in detail below is switched into the blocking state.

According to the disclosed embodiments, there is also provided a detecting circuit 9, in order to determine, in a measuring mode taking place outside of the time frame of the heating mode, the measuring capacitance of the heating wire 2 relative to a reference potential, such as vehicle ground 16, by applying to the heating wire 2 an alternating voltage $V_{AC}$ from an AC voltage source 12, in this case a sine-wave generator controlled by the microcontroller 12. Based on a change in this capacitance, the approach of a vehicle occupant B, or at least the approach of a hand of the vehicle occupant B, can be detected, for example. In this case, the detecting circuit 9 is designed for measuring in the measuring mode a current curve between the heating conductor 2 and the AC voltage source 12 resulting from the application of the alternating voltage $V_{AC}$, in order to determine therefrom the capacitance, based on a phase shift between the alternating voltage $V_{AC}$ and the current curve. In detail, the current curve is measured based on a voltage drop on a shunt resistor 8 (shunt) while amplifying the signal by means of a measuring amplifier of the detecting circuit, whose measurement result is transmitted to the microcontroller 12.

The switchover from the heating mode into the measuring mode is caused by the microcontroller 13 in cooperation with the control circuit parts 6a, 6b, so that in the measuring mode, the first switching elements 3a, 3b and the second switching elements 4a, 4b are in a blocking state, so that the two connections of the heating wire 2 with the two different heating potentials $V_{H+}$, $V_{H-}$, which are electrically conducting in the heating mode, are each interrupted several times in the measuring mode.

The multiple interruptions with regard to the two heating potentials $V_{H+}$, $V_{H-}$ is advantageous in that, in addition to the particularly effective capacitive decoupling of the heating wire 2 with respect to the heating potentials $V_{H+}$, $V_{H-}$ and the reduction of the parasitic capacitances on the connection with the heating potentials $V_{H+}$, $V_{H-}$, which is interrupted several times and in which now the switching elements 3a, 3b; 4a, 4b are to be considered as series-connected capacitive impedances, a detecting circuit 9 using an alternating voltage $V_{AC}$ for detection can also be used in an improved manner, because the first switching elements 3a, 3b, as opposed, for example, to the non-symmetrically connected diodes of the prior art, separate symmetrically, and this separation has an effect on both current directions of the alternating current generated in the measuring mode, which facilitates and improves the determination of the capacitance by means of alternating voltage $V_{AC}$, but particularly the preferred path via the detection of the phase shift. Due to the control of the control circuit parts 6a, 6b by the microcontroller 13 using the pulse-width modulated control signals $PWM_a$ or $PWM_b$, the circuit structure 1 is designed such that the heating mode and the measuring mode are operated in an alternating manner. In this case, the microcontroller 13 regulates the duty cycle of the pulse-width modulated control signals $PWM_a$ or $PWM_b$ in accordance with a desired and/or predetermined heating power.

In the depicted circuit structure 1 according to the embodiment, there is also provided a shielding circuit 7, which is configured to apply the alternating voltage $V_{AC}$ from the AC voltage source 12 during the measuring mode not only to the conductor portions 5a, 5b between, in each case, the first switching element 3a, 3b and the second switching element 4a, 4b, but also to the control terminals Ga, Gb of the first switching elements 3a, 3b. In this case, the usage of the term alternating voltage is supposed to refer to the fact that the alternating voltage $V_{AC}$ present on the heating wire 2 in the measuring mode and the alternating voltage $V_{AC}$ present on the conductor portions 5a, 5b substantially match each other with respect to amplitude, frequency and phase in order to obtain an optimum shielding effect.

The detecting circuit 9 is supplemented with a compensating circuit 11 for compensating a temperature-dependent blocking behavior of the first switching elements 3a, 3b, in order to compensate a temperature-dependent reactive current or a temperature-dependent blocking behavior of these first switching elements 3a, 3b. Here, the compensating circuit 11 is provided and configured for changing the operating point of the measuring amplifier measuring the curve of the alternating current of the detecting circuit 9 in a temperature-dependent manner and so as to counteract the change of the blocking behavior. For this purpose, the compensating circuit has, for example, a reference circuit forming an R-2R network, which is connected to the microcontroller 13 for controlling the compensation.

According to the disclosed embodiments, the control circuit 6a, 6b, 13 is further configured for switching in a testing phase, which takes place within the time frame of the measuring mode, a test circuit 14, 15 containing at least one third switching element 14 and one test impedance 15 such that the test impedance 15 is connected to the measuring capacitance, and an associated change in measuring capacitance and/or a total impedance including the measuring capacitance and the test impedance is at least detected by the detecting circuit 9. For example, a change in the measuring capacitance caused by connecting the test impedance 15 is detected merely qualitatively. Another embodiment provides a quantitative measurement of the resulting total impedance including the measuring capacitance and the test impedance 15 in order to permit a calibration of the detecting circuit by means of the predetermined test impedance. In a simple embodiment, an examination is made only with regard to a coincidence in time of the change in measuring capacitance and the change in the switching state. By providing the testing phase and the associated design features, it is possible by a comparatively simple technical expansion of the design of a heating and measuring circuit to test the integrity of the heating wire 2 on the one hand, but on the other hand also the function of the detecting circuit 9, and in the case of a quantitative test, e.g. by determining the change in measuring capacitance or the total impedance resulting in the testing phase, to carry out a calibration of the detecting circuit 9 or downstream evaluation devices. Preferably, the duration of the testing phase is shorter than the duration of a measuring mode carried out between two successive heating modes. At least the third switching element 14 is in a blocking state in the period of the measuring mode outside of the testing phase. In order to be able to test the heating wire 2 across its entire length, the alternating voltage $V_{AC}$ is in this case applied at one end of the heating wire 2, while the test impedance 15 is connected to the opposite end of the heating wire 2, so that the test impedance 15 associated with the test circuit 14, 15 is connected in parallel with the measuring capacitance in the testing phase. In this case, the third switching element 14 connects the heating wire 2 to the reference potential 16 via the test impedance 15 in an electrically conducting manner in the testing phase. In this case, the test impedance 15 is a capacitor with a predetermined test capacitance. In order to avoid parasitic capacitances, the third switching element 14 is a bipolar transistor. For example, the time ratio of the duration of the testing phase to the total duration of the measuring mode containing the testing phase is less than $1/10$.

The sequence in time of the heating mode and the measuring mode is not shown in more detail. In one embodiment, the testing phase takes place exclusively over a period within which an approach of the hands to the steering wheel is excluded, e.g. in the locked, unoccupied state of the vehicle cabin. In another embodiment, the testing phase is carried out exclusively when no approach was detected in a preceding measuring mode taking place outside the testing phase. In one embodiment, the testing phase is carried out at the start of a measuring mode. In the alternating sequence of the heating mode and the measuring mode, it may be provided that among several measuring modes, at least one, preferably the majority of measuring modes, is carried out without a testing phase.

What is claimed is:

1. An electric circuit structure for an alternating heating and capacitive measuring mode, comprising:
   a pair of first switching elements and a pair of second switching elements;
   a heating wire connected to the first switching elements and the second switching elements in such a manner that in a heating mode, during which the first switching elements and the second switching elements are in a conducting state, the first switching elements, the second switching elements, and the heating wire are connected in series, and the heating wire is conductively connected, in each case via a one of the first switching elements and a one of the second switching elements which are connected via a conductor portion to the first switching element, to one of two different heating potentials, so that the heating wire is supplied with a heating current;
   a detecting circuit to determine, in a measuring mode taking place outside of a time frame of the heating mode, a measuring capacitance of the heating wire relative to a reference potential by applying to the heating wire an alternating voltage from an AC voltage source;
   a test circuit having at least one third switching element and a test impedance;
   a control circuit configured for switching the first switching elements and second switching elements from the heating mode into the measuring mode, wherein the first switching elements and the second switching elements are in a blocking state during the measuring mode, so that two connections of the heating wire with the two different heating potentials, which are electrically conducting in the heating mode, are each interrupted several times in the measuring mode, and the control circuit is further configured to switch, in a testing phase within the measuring mode, the test circuit such that the test impedance is connected to the measuring capacitance, and an associated change in at least one of: the measuring capacitance and a total impedance including the measuring capacitance and the test impedance is at least detected by the detecting circuit;

wherein the test impedance is connected to the measuring capacitance in parallel in the testing phase;

wherein the at least one third switching element connects the heating wire to the reference potential via the test impedance in an electrically conducting manner in the testing phase; and wherein the test impedance is a capacitor with a predetermined test capacitance.

2. The electric circuit structure according to claim 1, wherein the third switching element is a bipolar transistor.

3. The electric circuit structure according to claim 1, further comprising a shielding circuit, which is configured to apply to at least the conductor portions the alternating voltage from the AC voltage source during the measuring mode.

4. The electric circuit structure according to claim 3, wherein at least the first switching elements are transistors, and the shielding circuit is configured so that in the measuring mode, the alternating voltage is applied in each case to a control terminal of the transistor.

5. The electric circuit structure according to claim 1, wherein the detecting circuit is adapted to measure, in the measuring mode, a current curve between the heating wire and the AC voltage source resulting from the application of the alternating voltage, in order to determine therefrom the measuring capacitance, based on a phase shift between the alternating voltage and the current curve, and to detect the change in the measuring capacitance and/or determine the total impedance in the testing phase.

6. The electric circuit structure, according to claim 1, wherein the detecting circuit is supplemented with a compensating circuit, wherein the compensating circuit compensates a temperature-dependent blocking behavior of the first switching elements.

7. The electric circuit structure according to claim 1, wherein the electric circuit structure is used in a motor vehicle, wherein the heating wire is integrated into a steering wheel of the motor vehicle.

8. A method for carrying out an alternating heating and capacitive measuring mode by means of a common heating wire, comprising the following steps:

carrying out a heating mode, during which, due to a switching by a control circuit, a pair of first switching elements and a pair of second switching elements are in a conducting state, the first switching elements and the second switching elements and the heating wire are connected in series, and the heating wire is conductively connected, in each case via a one of the first switching elements and a one of the second switching elements which are connected via a conductor portion to the first switching element, to one of two different heating potentials, so that the heating wire is supplied with a heating current;

triggering a switchover from the heating mode into a measuring mode of the first switching elements and the second switching elements by the control circuit, wherein the first switching elements and the second switching elements are in a blocking state during the measuring mode, so that two connections of the heating wire with the two different heating potentials, which are electrically conducting in the heating mode, are each interrupted several times in the measuring mode;

carrying out the measuring mode, in which the measuring capacitance of the heating wire relative to a reference potential is determined by a detecting circuit by applying to the heating wire an alternating voltage from an AC voltage source;

carrying out a testing phase, which takes place within a time frame of the measuring mode, and during which, by means of a test circuit containing at least one third switching element and one test impedance, the test circuit is switched by the control circuit that a test impedance is connected to the measuring capacitance, and an associated change in at least one of: the measuring capacitance and a total impedance including the measuring capacitance and the test impedance is at least detected by the detecting circuit;

wherein the test impedance is connected to the measuring capacitance in parallel in the testing phase;

wherein the at least one third switching element connects the heating wire to the reference potential via the test impedance in an electrically conducting manner in the testing phase; and wherein the test impedance is a capacitor with a predetermined test capacitance.

9. The method according to claim 8, wherein the third switching element is a bipolar transistor.

10. The method according to claim 8, wherein the alternating voltage from the AC voltage source is applied by a shielding circuit to the conductor portions during the measuring mode.

11. The method according to claim 8, wherein at least the first switching elements are transistors, and in the measuring mode, the alternating voltage is applied in each case to a control terminal of the transistor.

12. The method according to claim 8, wherein, in the measuring mode, a current curve between the heating wire and the AC voltage source resulting from the application of the alternating voltage is measured by the detecting circuit, in order to detect, based on a phase shift between the alternating voltage and the current curve, the measuring capacitance and, in the testing phase, the change in measuring capacitance and/or to determine the total impedance.

13. The method according to claim 8, wherein a temperature-dependent blocking behavior of the first switching elements is compensated in the measuring mode.

14. The electric circuit structure according to claim 4, wherein the at least the first switching elements are field effect transistors.

15. The electric circuit structure according to claim 4, wherein the alternating voltage is applied to the control terminal of the transistor at any one of: a base and a gate.

16. The method according to claim 11, wherein the at least the first switching elements are field effect transistors.

17. The method according to claim 11, wherein the alternating voltage is applied to the control terminal of the transistor at any one of: a base and a gate.

* * * * *